(12) United States Patent
Frenz et al.

(10) Patent No.: US 9,609,478 B2
(45) Date of Patent: Mar. 28, 2017

(54) GEO-FENCING WITH DIAGNOSTIC FEATURE

(71) Applicant: Honeywell International Inc., Morristown, NJ (US)

(72) Inventors: Jonathan P. Frenz, Minneapolis, MN (US); Aaron J. Klein, Rochester, MN (US)

(73) Assignee: Honeywell International Inc., Morris Plains, NJ (US)

( * ) Notice: Subject to any disclaimer, the term of this patent is extended or adjusted under 35 U.S.C. 154(b) by 37 days.

(21) Appl. No.: 14/696,662

(22) Filed: Apr. 27, 2015

(65) Prior Publication Data

US 2016/0316329 A1  Oct. 27, 2016

(51) Int. Cl.
*H04W 4/02* (2009.01)
*H04W 24/08* (2009.01)

(52) U.S. Cl.
CPC .......... *H04W 4/021* (2013.01); *H04W 24/08* (2013.01)

(58) Field of Classification Search
CPC .............................. H04W 4/021; H04W 24/08
See application file for complete search history.

(56) References Cited

U.S. PATENT DOCUMENTS

| | | | |
|---|---|---|---|
| 6,255,988 B1 | 7/2001 | Bischoff | |
| 6,356,282 B2 | 3/2002 | Roytman et al. | |
| 6,400,956 B1 | 6/2002 | Richton | |
| 6,478,233 B1 | 11/2002 | Shah | |
| 6,529,137 B1 | 3/2003 | Roe | |
| 6,604,023 B1 | 8/2003 | Brown et al. | |
| 6,665,613 B2 | 12/2003 | Duvall | |
| 6,909,891 B2 | 6/2005 | Yamashita et al. | |
| 6,990,335 B1 | 1/2006 | Shamoon et al. | |
| 7,083,109 B2 | 8/2006 | Pouchak | |
| 7,127,734 B1 | 10/2006 | Amit | |
| 7,130,719 B2 | 10/2006 | Ehlers et al. | |
| 7,155,305 B2 | 12/2006 | Hayes et al. | |
| D535,573 S | 1/2007 | Barton et al. | |
| 7,159,789 B2 | 1/2007 | Schwendinger et al. | |
| 7,257,397 B2 | 8/2007 | Shamoon et al. | |

(Continued)

FOREIGN PATENT DOCUMENTS

CN     101689327     5/2013
EP      1515289      3/2005

(Continued)

OTHER PUBLICATIONS

U.S. Appl. No. 15/048,902, filed Feb. 19, 2016.

(Continued)

*Primary Examiner* — Kashif Siddiqui
(74) *Attorney, Agent, or Firm* — Seager, Tufte & Wickhem, LLP

(57) ABSTRACT

A mobile device having location services stores information pertaining to a geo-fence assigned to a building and stores a geo-fence log including one or more mobile device parameters and one or more geo-fence crossing events. The mobile device may determine the location of the mobile device via the location services and may determine when a geo-fence crossing event has occurred. Each of the geo-fence crossing events may be recorded in the geo-fence log, which may be uploaded to a remote server from time to time.

12 Claims, 13 Drawing Sheets

(56) References Cited

U.S. PATENT DOCUMENTS

| | | | |
|---|---|---|---|
| 7,327,250 | B2 | 2/2008 | Harvey |
| D580,801 | S | 11/2008 | Takach et al. |
| 7,451,017 | B2 | 11/2008 | McNally |
| 7,510,126 | B2 | 3/2009 | Rossi et al. |
| 7,571,865 | B2 | 8/2009 | Nicodem et al. |
| 7,614,567 | B2 | 11/2009 | Chapman et al. |
| 7,636,604 | B2 | 12/2009 | Bergman et al. |
| 7,668,532 | B2 | 2/2010 | Shamoon et al. |
| 7,768,393 | B2 | 8/2010 | Nigam |
| 7,801,646 | B2 | 9/2010 | Amundson et al. |
| 7,812,274 | B2 | 10/2010 | Dupont et al. |
| 7,908,211 | B1 | 3/2011 | Chen et al. |
| 7,949,615 | B2 | 5/2011 | Ehlers et al. |
| 7,953,518 | B2 | 5/2011 | Kansal et al. |
| 7,973,678 | B2 | 7/2011 | Petricoin, Jr. et al. |
| 8,018,329 | B2 | 9/2011 | Morgan et al. |
| 8,064,935 | B2 | 11/2011 | Shamoon et al. |
| 8,065,342 | B1* | 11/2011 | Borg ............... G06Q 10/06 455/456.1 |
| 8,095,340 | B2 | 1/2012 | Brown |
| 8,115,656 | B2 | 2/2012 | Bevacqua et al. |
| 8,125,332 | B2 | 2/2012 | Curran et al. |
| 8,180,492 | B2 | 5/2012 | Steinberg |
| 8,195,313 | B1 | 6/2012 | Fadell et al. |
| 8,205,244 | B2 | 6/2012 | Nightingale et al. |
| 8,232,877 | B2 | 7/2012 | Husain |
| 8,255,090 | B2 | 8/2012 | Frader-Thompson et al. |
| 8,269,620 | B2 | 9/2012 | Bullemer et al. |
| 8,280,536 | B1 | 10/2012 | Fadell et al. |
| 8,301,765 | B2 | 10/2012 | Goodman |
| 8,332,055 | B2 | 12/2012 | Veillette |
| 8,350,697 | B2 | 1/2013 | Trundle et al. |
| 8,386,082 | B2 | 2/2013 | Oswald |
| 8,390,473 | B2 | 3/2013 | Kryzanowski et al. |
| 8,412,381 | B2 | 4/2013 | Nikovski et al. |
| 8,412,654 | B2 | 4/2013 | Montalvo |
| 8,428,867 | B2 | 4/2013 | Ashley, Jr. et al. |
| 8,433,344 | B1 | 4/2013 | Virga |
| 8,442,695 | B2 | 5/2013 | Imes et al. |
| 8,457,797 | B2 | 6/2013 | Imes et al. |
| 8,509,954 | B2 | 8/2013 | Imes et al. |
| 8,531,294 | B2 | 9/2013 | Slavin et al. |
| 8,554,374 | B2 | 10/2013 | Lunacek et al. |
| 8,554,714 | B2 | 10/2013 | Raymond et al. |
| 8,571,518 | B2 | 10/2013 | Imes et al. |
| 8,587,445 | B2 | 11/2013 | Rockwell |
| 8,626,344 | B2 | 1/2014 | Imes et al. |
| 8,630,741 | B1 | 1/2014 | Matsuoka et al. |
| 8,644,813 | B1 | 2/2014 | Gailloux et al. |
| 8,648,706 | B2 | 2/2014 | Ranjun et al. |
| 8,670,783 | B2 | 3/2014 | Klein |
| 8,798,804 | B2 | 8/2014 | Besore et al. |
| 8,810,454 | B2 | 8/2014 | Cosman |
| 8,840,033 | B2 | 9/2014 | Steinberg |
| 8,874,129 | B2 | 10/2014 | Forutanpour et al. |
| 8,886,178 | B2 | 11/2014 | Chatterjee |
| 8,890,675 | B2 | 11/2014 | Ranjan et al. |
| 8,909,256 | B2 | 12/2014 | Fraccaroli |
| 8,918,219 | B2 | 12/2014 | Sloo et al. |
| 8,941,489 | B2 | 1/2015 | Sheshadri et al. |
| 8,965,401 | B2 | 2/2015 | Sheshadri et al. |
| 8,965,406 | B2 | 2/2015 | Henderson |
| 9,026,261 | B2 | 5/2015 | Bukhin et al. |
| 9,033,255 | B2 | 5/2015 | Tessier et al. |
| 9,055,475 | B2 | 6/2015 | Lacatus et al. |
| 9,066,316 | B2 | 6/2015 | Secades et al. |
| 9,071,453 | B2 | 6/2015 | Shoemaker et al. |
| 9,075,716 | B2 | 7/2015 | Dempski et al. |
| 9,137,664 | B2 | 9/2015 | Fok et al. |
| 9,183,530 | B2 | 11/2015 | Schwarz et al. |
| 9,215,560 | B1 | 12/2015 | Jernigan |
| 9,219,983 | B2 | 12/2015 | Sheshadri et al. |
| 9,225,623 | B2 | 12/2015 | Sokolik et al. |
| 2002/0147006 | A1 | 10/2002 | Coon et al. |
| 2005/0172056 | A1 | 8/2005 | Ahn |
| 2006/0063522 | A1 | 3/2006 | McFarland |
| 2006/0097063 | A1 | 5/2006 | Zeevi |
| 2006/0192673 | A1* | 8/2006 | Irwin ............... G06Q 10/08 340/539.13 |
| 2007/0037605 | A1 | 2/2007 | Logan |
| 2007/0099626 | A1 | 5/2007 | Lawrence et al. |
| 2007/0114295 | A1 | 5/2007 | Jenkins |
| 2007/0249319 | A1 | 10/2007 | Faulkner et al. |
| 2008/0094230 | A1 | 4/2008 | Mock et al. |
| 2010/0034386 | A1 | 2/2010 | Choong et al. |
| 2010/0081375 | A1 | 4/2010 | Rosenblatt et al. |
| 2010/0127854 | A1 | 5/2010 | Helvick et al. |
| 2010/0156628 | A1 | 6/2010 | Ainsbury et al. |
| 2010/0261465 | A1 | 10/2010 | Rhoads et al. |
| 2011/0153525 | A1 | 6/2011 | Benco et al. |
| 2012/0172027 | A1 | 7/2012 | Partheesh et al. |
| 2012/0191257 | A1 | 7/2012 | Corcoran et al. |
| 2012/0209730 | A1 | 8/2012 | Garrett |
| 2013/0045753 | A1* | 2/2013 | Obermeyer ....... G08B 21/0277 455/456.1 |
| 2013/0073094 | A1 | 3/2013 | Knapton et al. |
| 2013/0099977 | A1* | 4/2013 | Sheshadri ........... H04W 4/022 342/450 |
| 2013/0204441 | A1 | 8/2013 | Sloo et al. |
| 2013/0225196 | A1 | 8/2013 | James et al. |
| 2013/0231137 | A1 | 9/2013 | Hugie et al. |
| 2013/0310053 | A1 | 11/2013 | Srivastava et al. |
| 2013/0318217 | A1 | 11/2013 | Imes et al. |
| 2013/0331087 | A1 | 12/2013 | Shoemaker et al. |
| 2014/0031989 | A1 | 1/2014 | Bergman et al. |
| 2014/0031991 | A1 | 1/2014 | Bergman et al. |
| 2014/0156087 | A1 | 6/2014 | Amundson |
| 2014/0164118 | A1 | 6/2014 | Polachi |
| 2014/0172176 | A1 | 6/2014 | Deilmann et al. |
| 2014/0192737 | A1* | 7/2014 | Belghoul ........... H04W 76/023 370/329 |
| 2014/0200718 | A1 | 7/2014 | Tessier |
| 2014/0244048 | A1 | 8/2014 | Ramachandran et al. |
| 2014/0266635 | A1 | 9/2014 | Roth et al. |
| 2014/0277762 | A1 | 9/2014 | Drew |
| 2014/0279123 | A1* | 9/2014 | Harkey ............... H04L 67/18 705/26.1 |
| 2014/0330435 | A1 | 11/2014 | Stoner et al. |
| 2014/0337123 | A1 | 11/2014 | Nuernberg et al. |
| 2014/0349672 | A1 | 11/2014 | Kern et al. |
| 2014/0370911 | A1* | 12/2014 | Gorgenyi ......... H04W 52/0251 455/456.1 |
| 2015/0065161 | A1 | 3/2015 | Ganesh et al. |
| 2015/0140994 | A1 | 5/2015 | Partheesh et al. |
| 2015/0141045 | A1 | 5/2015 | Qiu et al. |
| 2015/0163631 | A1 | 6/2015 | Quam et al. |
| 2015/0163945 | A1* | 6/2015 | Barton ............... F24F 11/006 361/809 |
| 2015/0237193 | A1* | 8/2015 | Zeilingold ....... H04M 1/72572 455/418 |
| 2015/0237470 | A1 | 8/2015 | Mayor et al. |
| 2015/0281889 | A1* | 10/2015 | Menendez ........... H04W 4/021 455/456.1 |
| 2015/0301543 | A1 | 10/2015 | Janoso et al. |
| 2016/0007156 | A1 | 1/2016 | Chiou et al. |
| 2016/0012451 | A1 | 1/2016 | Shanmugam et al. |

FOREIGN PATENT DOCUMENTS

| | | |
|---|---|---|
| MX | 2012000906 | 9/2012 |
| WO | WO 2009/034720 | 3/2009 |
| WO | WO 2009/036764 | 3/2009 |
| WO | WO 2009/067251 | 5/2009 |
| WO | WO 2011/011404 | 1/2011 |
| WO | WO 2012/000107 | 1/2012 |
| WO | WO 2013/118142 | 8/2013 |
| WO | WO 2013/170791 | 11/2013 |
| WO | WO 2014/016705 | 1/2014 |
| WO | WO 2014/047501 | 3/2014 |
| WO | WO 2014/144323 | 9/2014 |
| WO | WO 2014/197320 | 12/2014 |

(56) References Cited

FOREIGN PATENT DOCUMENTS

OTHER PUBLICATIONS

Balaji et al., "Sentinel: Occupancy Based HVAC Actuation Using Existing WiFi Infrastructure Within Commercial Buildings," SenSys '13, 14 pages, Nov. 11-15, 2015.
"Petition for Inter Partes Review of U.S. Pat. No. 8,571,518 Pursuant to 35 U.S.C. 311-319, 37 CFR 42," Inventor Imes et al., dated Oct. 29, 2014.
Do, "Programmable Communicating Thermostats for Demand Response in California," DR ETD Workshop, 26 pages, Jun. 11, 2007.
Green, "PM's Thermostat Guide," Popular Mechanics, pp. 155-158, Oct. 1985.
Gupta et al., "Adding GPS-Control to Traditional Thermostats: An Exploration of Potential Energy Savings and Design Challenges," Pervasive, LNCS 5538, pp. 95-114, 2009.
Gupta, "A Persuasive GPS-Controlled Thermostat System," 89 pages, Sep. 2008.
http://community.lockitron.com/notifications-geofencing-scheduling-sense-bluetooth/633, "Lockitron Community, Notifications, Geofencing, Scheduling, Sense/Bluetooth," 14 pages, printed Oct. 29, 2014.
http://stackoverflow.com/questions/14232712/tracking-multiple-20-locations-with-ios-geofencing, "Tracking Multiple (20+) Locations with iOS Geofencing—Stack Overflow," 2 pages, printed Oct. 29, 2014.
http://www.allure-energy.com/aenf_jan9_12.html, "CES Gets First Look at EverSense," Allure Energy, 2 pages, printed Feb. 17, 2015.
http://IWww.prnev.tswire.com/nev.ts-releases/allure-energy-unveils-a-combination-of-ibeacon-and-nfc-enabled-smart-sensor-technology-known-as-aura-23885 . . . , "Allure Energy Unveils a Combination of iBeacon and NFC Enabled Smart Sensor Technology Known as Aura," 6 pages, Jan. 6, 2014.
Mobile Integrated Solutions, LLC, "MobiLinc Take Control of Your Home, MobiLinc and Geo-Fence Awareness," 9 pages, downloaded Mar. 27, 2015.
Pan et al., "A Framework for Smart Location-Based Automated Energy Controls in a Green Building Testbed," 6 pages, downloaded Jan. 30, 2015.
SmartThings Inc., "2 Ecobee Si Thermostat + Geofencing," 17 pages, downloaded Nov. 3, 2014.
U.S. Appl. No. 14/640,984, filed Mar. 6, 2015.
U.S. Appl. No. 14/668,800, filed Mar. 25, 2015.
U.S. Appl. No. 14/696,725, filed Apr. 27, 2015.
U.S. Appl. No. 14/933,948, filed Nov. 5, 2015.
U.S. Appl. No. 14/934,543, filed Nov. 6, 2015.
U.S. Appl. No. 14/938,595, filed Nov. 11, 2015.
U.S. Appl. No. 14/938,642, filed Nov. 11, 2015.
U.S. Appl. No. 14/964,264, filed Dec. 9, 2015.
U.S. Appl. No. 14/964,349, filed Dec. 9, 2015.

\* cited by examiner

| 6 | Home | Geofence Arrive | 7/13/2014 4:23:59 PM |
| 7 | Home | Geofence Arrive | 7/13/2014 5:08:31 PM |
| 8 | Home | Geofence Arrive | 7/14/2014 10:32:01 PM |
| 9 | Home | Geofence Arrive | 7/15/2014 10:06:49 PM |

FIG. 9

GEO-FENCING WITH DIAGNOSTIC FEATURE

TECHNICAL FIELD

The disclosure relates generally to building automation and more particularly to building automation systems with geo-fencing capabilities.

BACKGROUND

Building automation systems are often used to control safety, security and/or comfort levels within a building or other structure. Illustrative but non-limiting examples of building automation systems include Heating, Ventilation and/or Air Conditioning (HVAC) systems, security systems, lighting systems, fire suppression systems and/or the like. In some cases, a building automation system may enter an unoccupied mode when the building is expected to be unoccupied and an occupied mode when the building is expected to be occupied. For example, when the building automation system includes an HVAC system, the building automation system may set a temperature set point of the HVAC system to a more energy efficient setting when in an unoccupied mode and a more comfortable setting when in an occupied mode. In another example, when the building automation system includes a security system, the building automation system may set the security system to a locked or away state when in an unoccupied mode and an unlocked or home state when in an occupied mode.

SUMMARY

The present disclosure pertains generally to geo-fencing, and more particularly to building automation systems with geo-fencing capabilities. An example of the disclosure may be found in a non-transitory computer-readable storage medium with an executable program stored thereon. The executable program may instruct a mobile device having location services to store information pertaining to a geo-fence assigned to a building and to identify when the mobile phone crosses the geo-fence with the aid of the location services of the mobile device. The executable program may instruct the mobile device to record a log of geo-fence crossings in a geo-fence log and to upload the geo-fence log to a remote server from time to time.

Another example of the disclosure may be found in a mobile device having location services for determining a location of the mobile device. The mobile device may include a user interface, a memory and a controller. The memory may be configured to store an executable program and information pertaining to a geo-fence assigned to a building and to store a geo-fence log for storing one or more mobile device parameters and/or one or more geo-fence crossing events. The controller may be operatively coupled to the user interface and to the memory and may be configured to determine the location of the mobile device via the location services and to determine when a geo-fence crossing event has occurred. The controller may record each of the geo-fence crossing events in the geo-fence log and may upload the geo-fence log to a remote server from time to time.

Another example of the disclosure may be found in a building automation server servicing a user's building, the user having a mobile device with an executable program. The building automation system may include a memory, a communications module and a controller. The memory may be for storing a geo-fence that defines a region about the user's building as well as information including a log describing mobile device conditions and/or executable program conditions that correspond to geo-fence crossing events. The communications module may be configured to communicate with the user's mobile device and receive the information including the log describing mobile device conditions and/or executable program conditions that correspond to geo-fence crossing events. The controller may be operably coupled to the memory and the communications module and may be configured to process the information including the log describing mobile device conditions and/or executable program conditions that correspond to geo-fence crossing events. The controller may output, via the communications module, diagnostic data pertaining to the processed information.

BRIEF DESCRIPTION OF THE DRAWINGS

FIGS. 9 through 13 provide illustrative but non-limiting examples of how the geo-fence log information may be processed once uploaded to the remote server.

Figure 1:
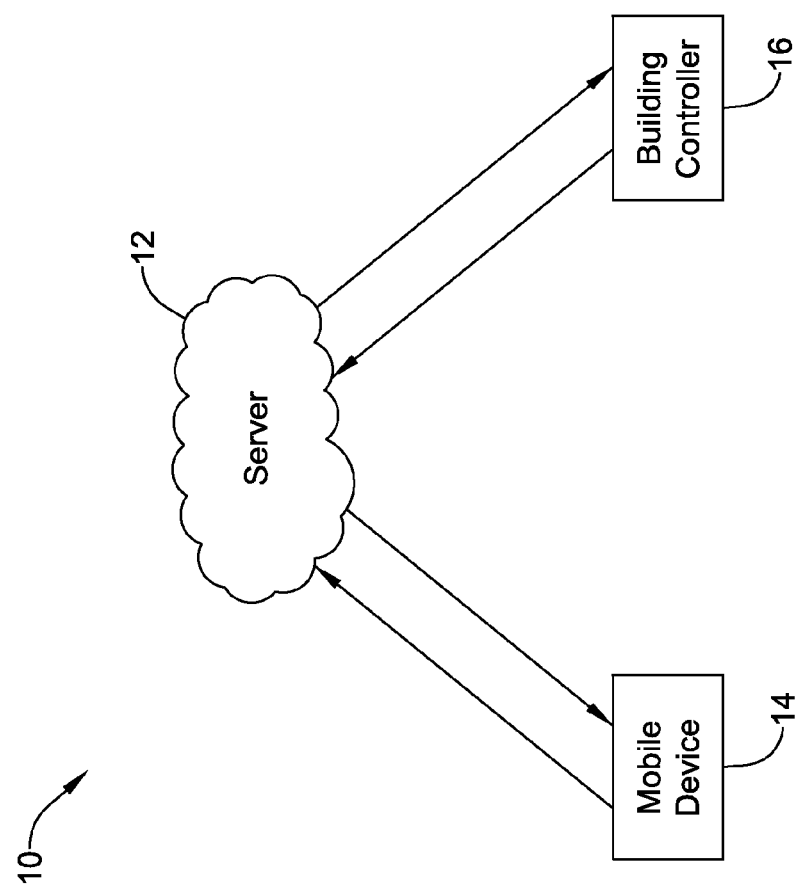
FIG. 1 is a schematic view of an illustrative building automation system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

The present disclosure is directed generally at building automation systems. Building automation systems are systems that control one or more operations of a building. Building automation systems can include HVAC systems, security systems, fire suppression systems, energy management systems and/or any other suitable systems. While HVAC systems are used as an example below, it should be recognized that the concepts disclosed herein can be applied to building control systems more generally.

A building automation system may include a controller, computer and/or other processing equipment that is configured to control one or more features, functions, systems or sub-systems of a building. In some cases, devices that can be used by individuals to communicate with the controller, computer and/or other processing equipment. In some cases, a building automation system may include a plurality of components that, in combination, perform or otherwise provide the functionality of the building automation system. A building automation system may be fully contained within a single building, or may include components that are spread between multiple housings and/or across multiple locations. In some embodiments, a building automation system, regardless of the physical location(s) of the components within the building automation system, may control one or more building systems within a single building. In some cases, a building automation system, regardless of the physical location(s) of the components within the building automation system, may control one or more building systems within a plurality of buildings, optionally in accordance with a common operating procedure and/or distinct operating procedures for each building as desired.

FIG. 1 is a schematic view of an illustrative building automation system 10. The illustrative building automation system 10 includes a server 12 that may be configured to communicate with a mobile device 14 and with a building controller 16. It will be appreciated that for simplicity, only a single mobile device 14 is shown, while in many cases the server 12 may be configured to communicate directly or indirectly with any number of mobile devices 14. Similarly, while a single building controller 16 is illustrated, in many cases the server 12 may be configured to communicate directly or indirectly with any number of building controllers 16, located in a single building or distributed throughout a plurality of buildings. The server 12 is illustrated as a single, cloud-based server. In some cases, the server 12 may be a single server. In some instances, the server 12 may generically represent two, three or more servers commonly located or spread between two or more physical locations. In some cases, the server 12 handles communication with both the mobile device 14 and the building controller 16. In some instances, as shown for example in FIG. 2, distinct servers may carry out each communications protocol if desired.

In some cases, the mobile devices 14 may communicate with the server 12 at least partially through a network such as the Internet, sometimes using a cell phone network, WiFi network and/or any other suitable network. Likewise, it is contemplated that the building controller 16 may communicate with the server 12 at least partially through a network such as the Internet, sometimes using a cell phone network, WiFi network and/or any other suitable network.

Figure 2:
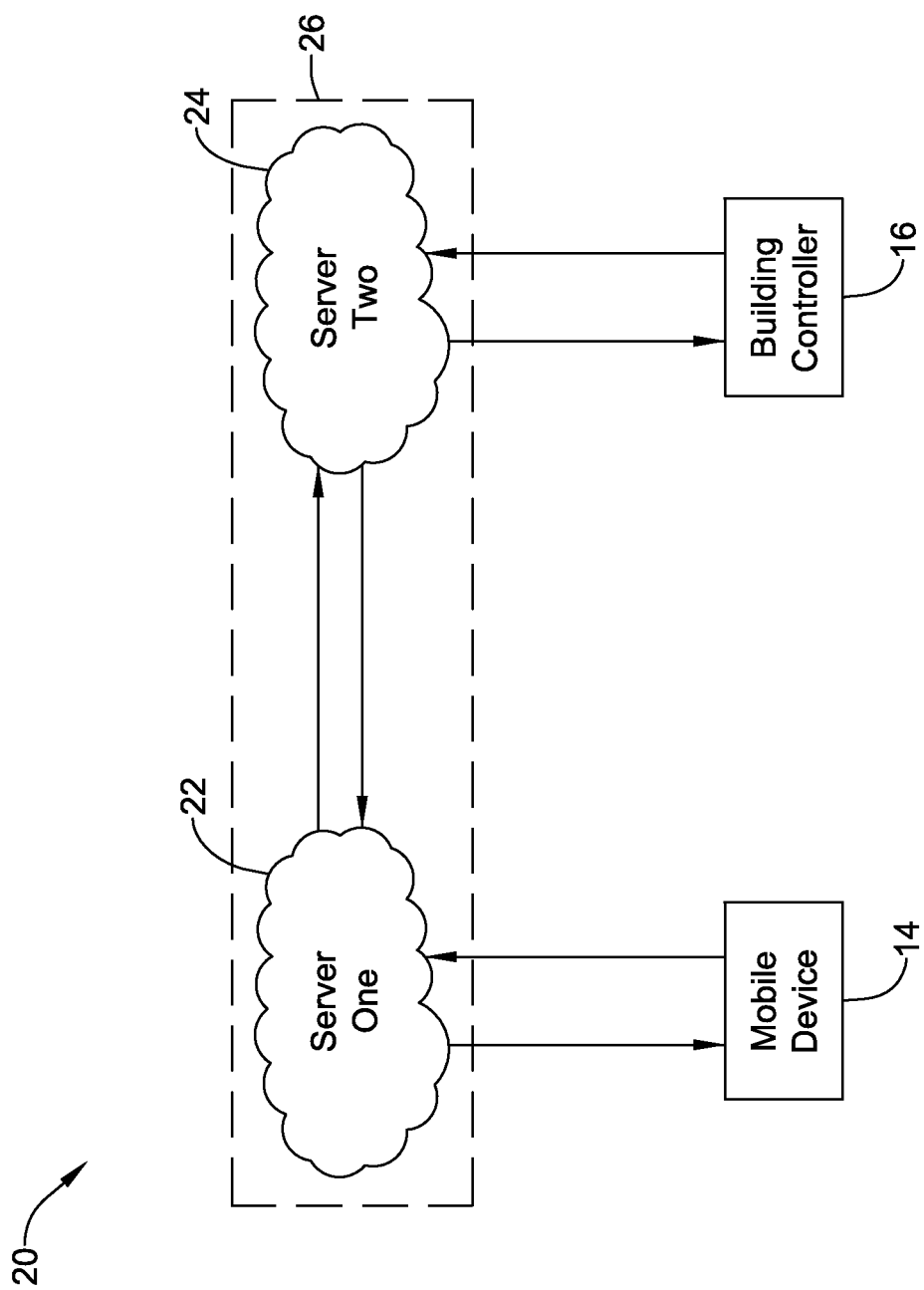
FIG. 2 is a schematic view of another illustrative building automation system.

FIG. 2 is a schematic illustration of another illustrative building automation system 20. The illustrative building automation system 20 includes a first server 22 that may be configured to communicate with a mobile device 14 (or multiple mobile devices 14) and a second server 24 that may be configured to communicate with a building controller 16 (or multiple building controllers 16). The first server 22 may be configured to receive data from the mobile device 14, process the data, and send data to the mobile device 14 and/or to the second server 24. The second server 24 may be configured to receive data from the building controller 16, process the data, and send data to the building controller 16 and/or to the first server 22. In some instances, the first server 22 may be configured to permit data from the mobile device 14 to pass directly through to the building controller 16. In some cases, the second server 24 may be configured to permit data from the building controller 16 to pass directly through to the mobile device 14. The first server 22 and the second server 24 may be configured to communicate with each other. In some cases, each of the first server 22 and the second server 24 may perform a defined function.

It will be appreciated that for simplicity, only a single mobile device 14 is shown, while in many cases the first server 22 may be configured to communicate directly or indirectly with any number of mobile devices 14. Similarly, while a single building controller 16 is illustrated, in many cases the second server 24 may be configured to communicate directly or indirectly with any number of building controllers 16, located in a single building or distributed throughout a plurality of buildings.

The first server 22 is illustrated as a single, cloud-based server. In some cases, the first server 22 may be a single server. In some instances, the first server 22 may generically represent two, three or more servers commonly located or spread between two or more physical locations. The second server 24 is illustrated as a single, cloud-based server. In some cases, the second server 24 may be a single server. In some instances, the second server 24 may generically represent two, three or more servers commonly located or spread between two or more physical locations. In some cases, the first server 22 and the second server 24 may, in combination, be considered as representing or forming a building automation server 26.

Figure 3:
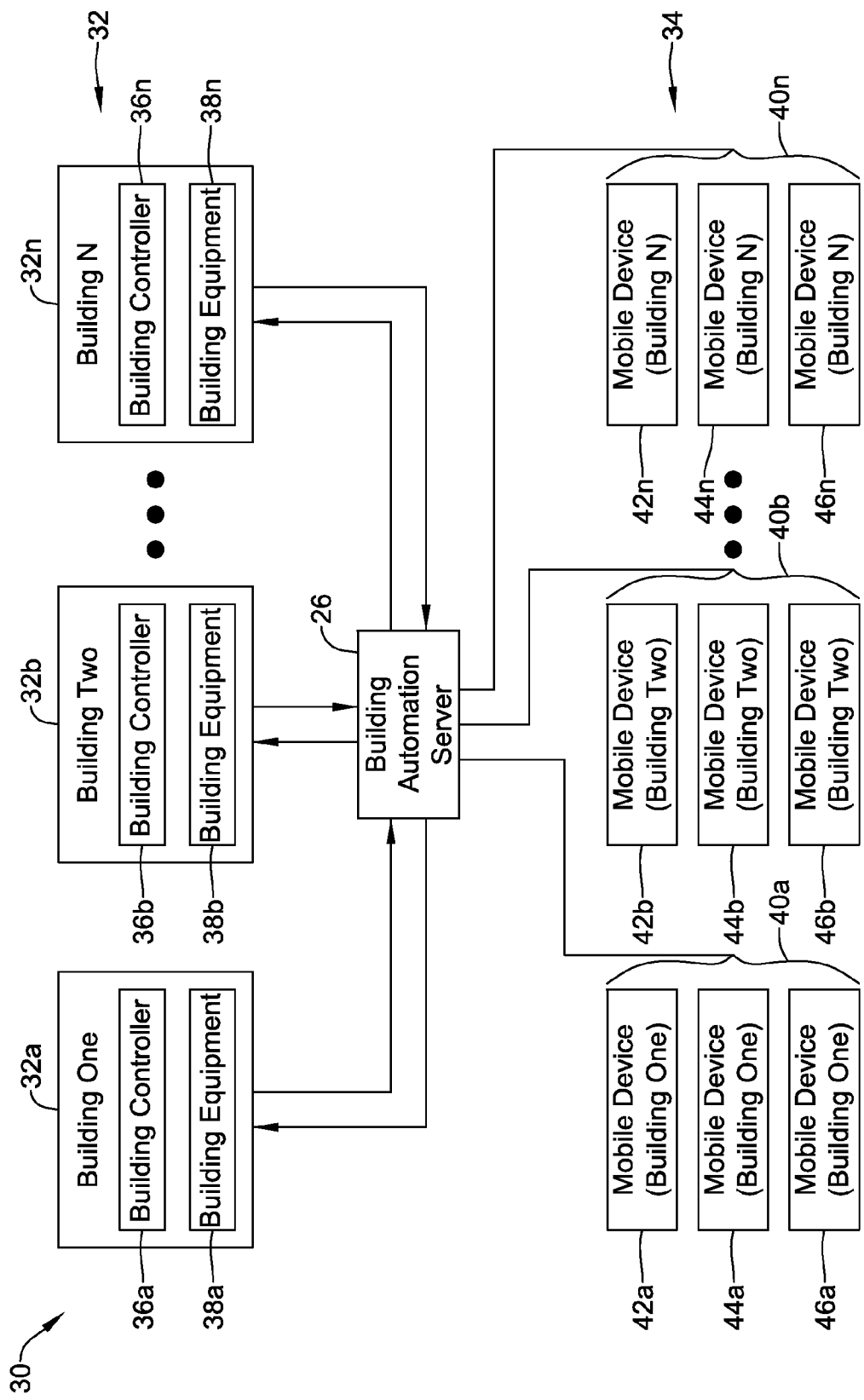
FIG. 3 is a schematic view of another illustrative building automation system.

FIG. 3 is a schematic illustration of a building automation system 30 in which a building automation server 26 is configured to communicate with a plurality of buildings 32 as well as a plurality of mobile devices 34. It is contemplated that the building automation server 26 may include a single server or two or more distinct servers at one or several locations. The building automation system 30 may serve any desired number of buildings. As illustrated, the plurality of buildings 32 includes a Building One, labeled as 32A, a Building Two, labeled as 32B, and so on through a Building "N", labeled as 32N. It will be appreciated that the building automation system 30 may include a large number of buildings, each in communication with a central (or distributed) building automation server 26. In some cases, each building may be associated with a unique customer account, as further described below.

As illustrated, each of the plurality of buildings 32 includes a building controller and one or more pieces of building equipment. The building equipment may, for example, be HVAC equipment, security equipment, lighting equipment, fire suppression equipment, and/or the like. In particular, the building 32A includes a building controller 36A and building equipment 38A, the building 32B includes a building controller 36B and building equipment 38B, and so on through the building 32N, which includes a building controller 36N and building equipment 38N. It will be appreciated that while each building is illustrated as having a single building controller and single building equipment controlled by the single building controller, in some cases a building may have multiple related or unrelated building controllers and/or multiple pieces of related or unrelated building equipment.

The plurality of mobile devices 34 may be considered as being divided into a set of mobile devices each associated with a corresponding building. In the example shown, the plurality of mobile devices 34 may be considered as being divided into a set of mobile devices 40A that are associated with the building 32A, a set of mobile devices 40B that are associated with the building 32B, and so on through a set of mobile devices 40N that are associated with the building 32N. As illustrated, the set of mobile devices 40A includes a first mobile device 42A, a second mobile device 44A and a third mobile device 46A. The set of mobile devices 40B includes a first mobile device 42B, a second mobile device 44B and a third mobile device 46B and so on through the set of mobile devices 40N, which includes a first mobile device 42N, a second mobile device 44N and a third mobile device 46N. This is merely illustrative, as any number of mobile devices such as smartphones or tablets, may be associated with a particular building, as desired. Each user or occupant of a building may have an associated mobile device, or may have several associated mobile devices. In some cases, a user or occupant may have a mobile device associated with several different locations such as a home, a cabin or a place of work.

Associating a mobile device with a particular building generally involves the individual who uses the particular mobile device. In the example shown in FIG. 3, a mobile device can communicate with the building automation server 26, and may cause the building automation server 26 to provide instructions to the building controller that is associated with the particular mobile device. For example, and in some instances, a mobile phone with location services activated can be used to inform the building automation server 26 as to the whereabouts of the user relative to a geo-fence defined for the associated building, and in some cases an estimate of how long before the user will arrive at the associated building. The building automation server 26 may send a command to the building controller of the associated building to operate the building equipment in an energy savings manner when all of the users that are associated with a particular building are determined to be away from the building (e.g. the building is unoccupied). The building automation server 26 may send a command to the building controller of the associated building to operate the building equipment in a comfort mode when all of the users that are associated with a particular building are determined or deemed not to be away from the building (e.g. the building is occupied).

Figure 4:
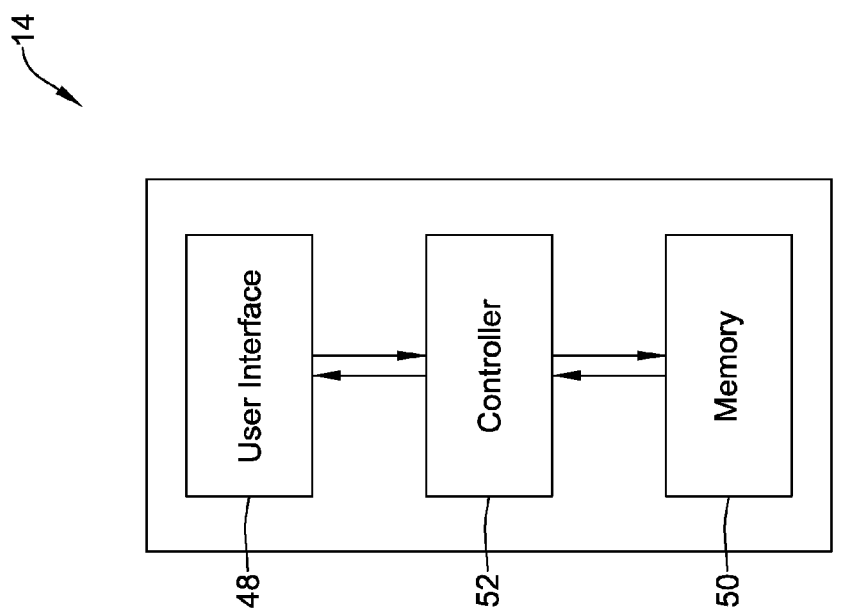
FIG. 4 is a schematic view of an illustrative mobile device.

FIG. 4 is a schematic diagram of the illustrative mobile device 14, as previously referenced in FIGS. 1 and 2. The illustrative mobile device 14 has location services for determining a location of the mobile device 14, and includes a user interface 48, a memory 50 and a controller 52 that is operably coupled to the user interface 48 and to the memory 50. In some cases, the memory 50 may be configured to store an executable program and information pertaining to a geo-fence assigned to a building as well as a geo-fence log for storing one or more mobile device parameters and one or more geo-fence crossing events. In some cases, the controller 52 may be configured to determine the location of the mobile device 14 via the location services and to determine when a geo-fence crossing event has occurred. The controller 52 may be configured to record each of the geo-fence crossing events in the geo-fence log, which is stored in the memory 50. In some cases, the controller 52 may be configured to upload the geo-fence log to a remote server, such as the building automation server 26 (FIGS. 2 and 3) from time to time.

In some cases, the controller 52 may record two or more geo-fence crossings in the geo-fence log before uploading the geo-fence log to a remote server. In some instances, the geo-fence log may include a time stamp for each geo-fence crossing event, although this is not required. In some cases, the geo-fence log may also record whether each geo-fence crossing was an inbound geo-fence crossing event, with the user of the mobile device 14 returning towards home, or an outbound geo-fence crossing event, with the user of the mobile device 14 moving away from home, for example.

The geo-fence log may include any variety of information pertaining to the mobile device 14 itself, such as but not limited to a version of the geo-fence application program running on the mobile device 14, the operating system version running on the mobile device 14, the mobile device telecommunications carrier, a log of geo-fence application program login events, a log of geo-fence application program logout events, a log of geo-fence application program opening events, a log of geo-fence application program closing events, and an indication of whether location services of the mobile device 14 is enabled. Additional illustrative but non-limiting examples include the client application type, such as iOS or Android; whether background application refreshing is turned on; whether a geo-fence radius or location coordinates have changed, and/or a new device has been added.

Further examples of information that may be included in a geo-fence log include whether or not background app-refresh is turned on for the geo-fence application program, the geo-fence coordinates and radii for each location, past 25 geo-fence events from the mobile operating system with time stamps, past 25 time stamps the user logged into or out of the geo-fence application program, and the past 25 time stamps when the geo-fence application program was closed and opened. In some cases, for each geo-fence event, the geo-fence log may include event time, location ID, the geo-fence trigger type, the radius of the geo-fence and the geo-fence type. The geo-fence log may include any additional data that may be considered as being useful in diagnosing any possible errors or problems with the geo-fencing service. It will be appreciated that the particular data collected in the geo-fence log may change over time, and may for example be dictated by the remote server such as the building automation server 26.

In some embodiments, for each geoFenceEvent, the following geo-fence parameters are logged:

EventTime: the time at which the event occurred.

LocationID: the location where the geo-fence was crossed.

Trigger: a string describing why the geo-fence event was triggered.

Radius: the size of the geo-fence radius.

Type: 0 means user has entered the geo-fence, 1 means user has left the geo-fence.

In some cases, for each geoFenceEventTriggerType, the following geo-fence parameters are logged:

FenceCrossed: a normal geo-fence event following a fence crossing.

OpenedFromPoweredOff: geo-fencing application was opened after the phone was off.

OpenedFromForcedClose: geo-fencing application was opened after the application was forced-closed.

NewShortcut: a new geo-fence shortcut was created.

ModifiedShortcut: a geo-fence shortcut was modified.

ObservedShortcutChang: geo-fencing application loaded shortcut changes.

GeofenceModified: geo-fencing application modified geo-fence coordinates or radius.

ObservedGeofenceModified: geo-fence application loaded a geo-fence change.

NewLocation: geo-fencing application added a new location.

ObservedNewLocation: geo-fencing application loaded a new location.

LoggedIn: user logged in.

In some cases, for each LoginLogoutEvent, the following geo-fence parameters are logged:

EventTime: time at which event occurs.

Type: 0, user logs out; 1, user logs in.

In some cases, for each LoginLogoutEventType, the following geo-fence parameters are logged:

UserLoggedOut: user has logged out.

UserLoggedIn: user has logged in.

It will be appreciated that these examples are illustrative only.

In some embodiments, the controller 52 of the mobile device 14 may upload the geo-fence log to a remote server, such as the building automation server 26, in accordance with a particular time frame. For example, the geo-fence log may be uploaded if a predetermined period of time has passed since the last upload. In some cases, the predetermined period of time may be a period that is less than 24 hours, 12 hours, 6 hours or less. In some cases, the predetermined period of time may not be a set length of time, but may instead be determined by the length of time for a particular number of geo-fence crossings to occur. For example, the controller 52 may upload the geo-fence log after every two geo-fence crossings, after every three geo-fence crossings, or any number of other geo-fence crossings. In some cases, the controller 52 may upload the geo-fence log in response to a trigger, which may include something done at or on the mobile device 14, and/or a remote event that is communicated to the mobile device 14.

In one example, a trigger may be a user logging into the geo-fence application program on the mobile device 14 via a physical login, in which the user enters their username and password, or an auto-login in which the application remembers and fills in the user's username and password. Another example trigger may be a user logging into the geo-fence application program after a forced close of the geo-fence application program, or a user logging out of the geo-fence application program. In some cases, a geo-fence crossing may function as a trigger. In some instances, the mobile device 14 may receive a request from a remote server, such as the building automation server 26, to upload the geo-fence log. This may be considered an external trigger.

Figure 5:
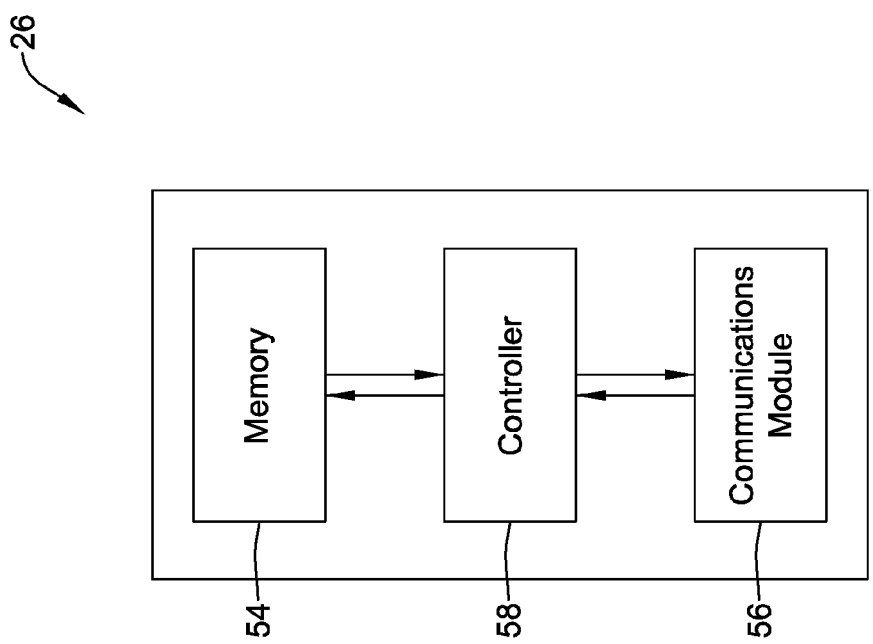
FIG. 5 is a schematic view of an illustrative building automation server.

FIG. 5 is a schematic view of an illustrative building automation server 26, as previously referenced in FIGS. 2 and 3. The building automation server 26 may be configured for servicing a user's building, and in some cases other buildings as well. The building automation server 26 may include a memory 54, a communications module 56 and a controller 58 that is operably coupled to the memory 54 and to the communications module 56. The memory 54 may be configured for storing a geo-fence that defines a region about the user's building, as well as a log describing mobile device conditions and/or executable program conditions that correspond to geo-fence cross events. The memory 54 may be considered as storing the geo-fence log(s) uploaded from one or more mobile devices 14 via the communications module 56. The communications module 56 may be configured to communicate with the user's mobile device 14 and receive the information including the geo fence log describing mobile device conditions and/or executable program conditions that correspond to geo-fence crossing events. In some cases, the executable program may be a geo-fence application program running on the mobile device. In some embodiments, the controller 58 may be configured to process the information including the log describing mobile device conditions and executable program conditions that correspond to geo-fence crossing events and to output, via the communications module, diagnostic data pertaining to the processed information. The diagnostic data may be useful in diagnosing geo-fence problems, and may help improve geo-fence reliability, accuracy and performance.

Figure 6:
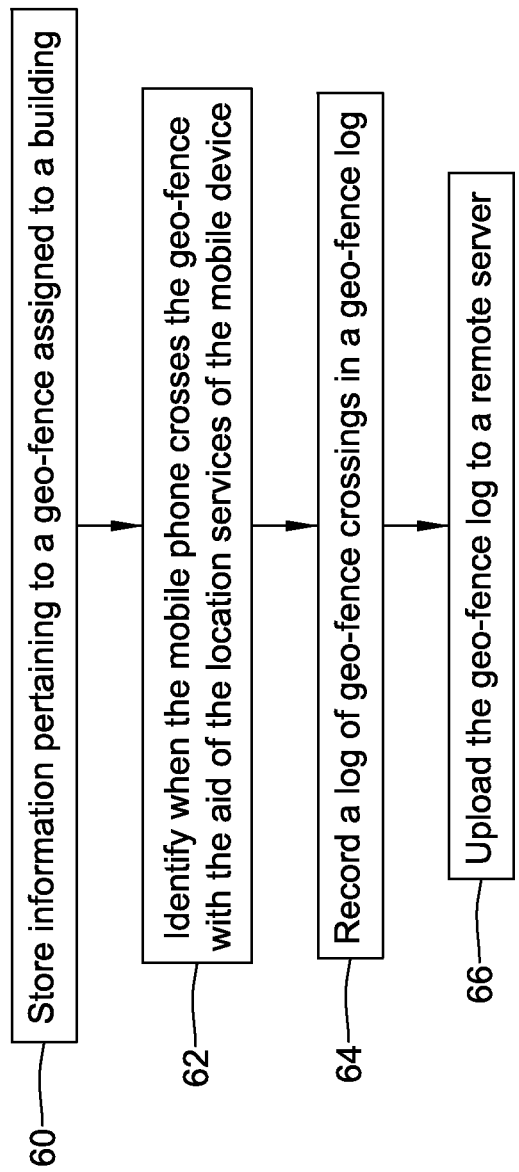
FIG. 6 is a flow diagram showing an illustrative method that may be carried out by the mobile device of FIG. 4.

FIG. 6 is a flow diagram of an illustrative method that may be carried out by the mobile device 14 having location services and executing an executable program such as a geo-fence application program that is stored in the memory 50 (FIG. 4). In some cases, the mobile device 14 may be a smartphone, but this is not required. At block 60, the mobile device 14 may store information pertaining to a geo-fence assigned to a building with which the user of the mobile device 14 is associated. As seen at block 62, the mobile device 14 may identify when the mobile device 14 crosses the geo-fence with the aid of the location services of the mobile device 14. A log of geo-fence crossings is recorded in a geo-fence log, as generally indicated at block 64. As seen at block 66, the mobile device 14 may upload the geo-fence log to a remote server such as the building automation server 26. In some cases, each of two or more geo-fence crossings are recorded in the geo-fence log before the mobile device 14 uploads the geo-fence log to the remote server. In some cases, a time stamp is recorded for each geo-fence crossing. In some cases, the geo-fence log includes whether each geo-fence crossing was an inbound crossing or an outbound crossing. Other information may be included in the geo-fence log as well.

Figure 7:
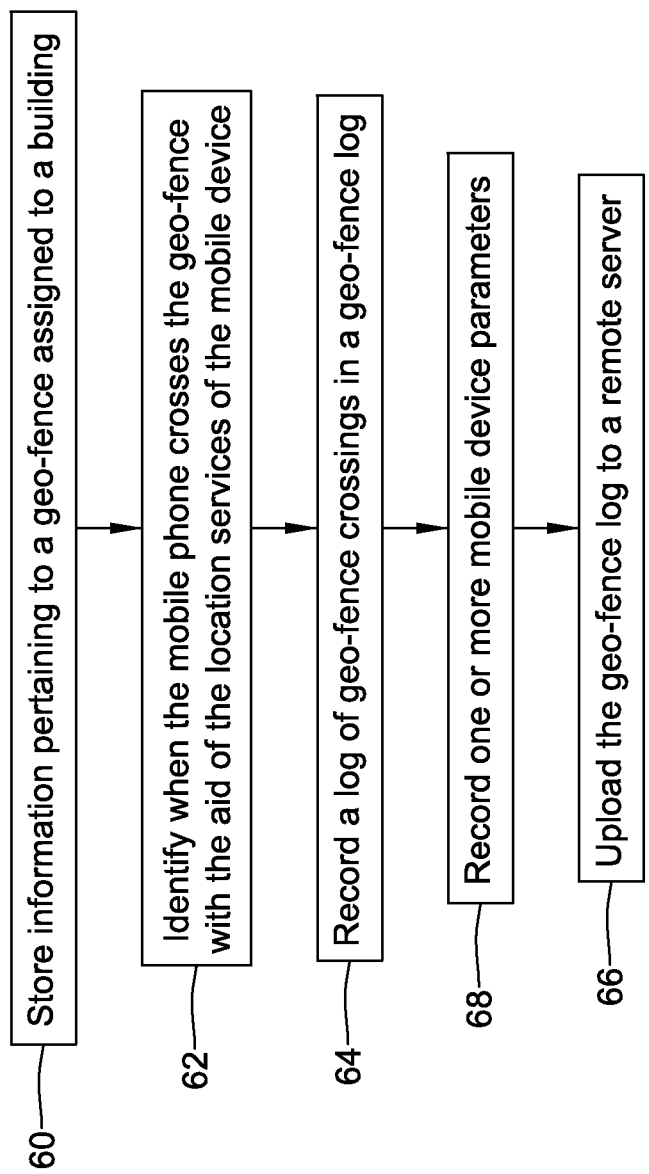
FIG. 7 is a flow diagram showing another illustrative method that may be carried out by the mobile device of FIG. 4.

FIG. 7 is a flow diagram of an illustrative method that may be carried out by the mobile device 14 having location services and executing an executable program such as a geo-fence application program that is stored in the memory 50 (FIG. 4). At block 60, the mobile device 14 may stores information pertaining to a geo-fence assigned to a building with which the user of the mobile device 14 is associated. As seen at block 62, the mobile device 14 may identify when the mobile device 14 crosses the geo-fence with the aid of the location services of the mobile device 14. A log of geo-fence crossings is recorded in a geo-fence log, as generally indicated at block 64. In some cases, as indicated at block 68, the mobile device 14 may record one or more mobile device parameters in the geo-fence log. Illustrative but non-limiting examples of mobile device parameters include, but are not limited to, a version of the geo-fence application program running on the mobile device 14, the operating system version running on the mobile device 14, the mobile device telecommunications carrier, a log of geo-fence application program login events, a log of geo-fence application program logout events, a log of geo-fence application program opening events, a log of geo-fence application program closing events, and an indication of whether location services of the mobile device 14 is enabled. As seen at block 66, the mobile device 14 may upload the geo-fence log to a remote server such as the building automation server 26.

Figure 8:
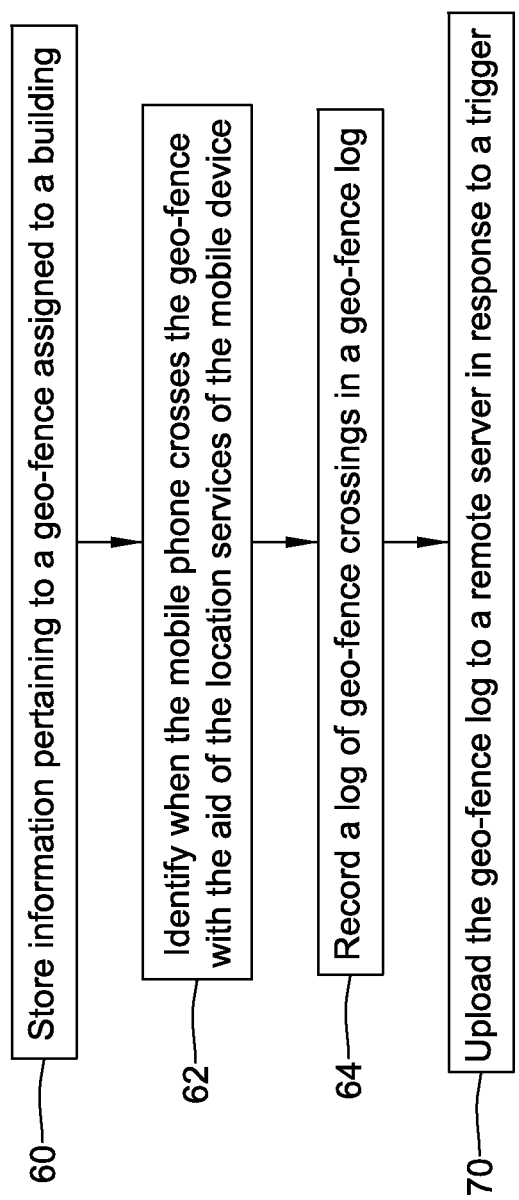
FIG. 8 is a flow diagram showing another illustrative method that may be carried out by the mobile device of FIG. 4.

FIG. 8 is a flow diagram of an illustrative method that may be carried out by the mobile device 14 having location services and executing an executable program such as a geo-fence application program that is stored in the memory 50 (FIG. 4). In some cases, the mobile device 14 may be a smartphone, but this is not required. At block 60, the mobile device 14 may store information pertaining to a geo-fence assigned to a building with which the user of the mobile device 14 is associated. As seen at block 62, the mobile device 14 may identify when the mobile device 14 crosses the geo-fence with the aid of the location services of the mobile device 14. A log of geo-fence crossings is recorded in a geo-fence log, as generally indicated at block 64. As seen at block 70, the mobile device 14 may upload the geo-fence log to a remote server such as the building automation server 26 in response to a trigger.

A variety of different triggers may cause the mobile device 14 to upload the geo-fence log. For example, a user logging into the geo-fence application program on the mobile device via a physical login or an auto-login may serve as a trigger. A user logging into the geo-fence application program on the mobile device 14 after a forced close of the geo-fence application program may be a trigger. A user logging out of the geo-fence application program may be a trigger. An identified geo-fence crossing may be a trigger. In some cases, the trigger may include a predetermined period of time passing without an upload, such as a period that is less than 24 hours. In some cases, a remote server such as the building automation server 26 may send an upload request to the mobile device 14, serving as a trigger.

FIG. 9 provides an example of data analysis or processing tied to a specific geo-fencing location such as a home or other building. In FIG. 9, the geo-fence log has recorded a total of four geo-fence arrive events, without any corresponding departures. This may be an indication that the geo-fence departure events are not being captured.

Figure 10:
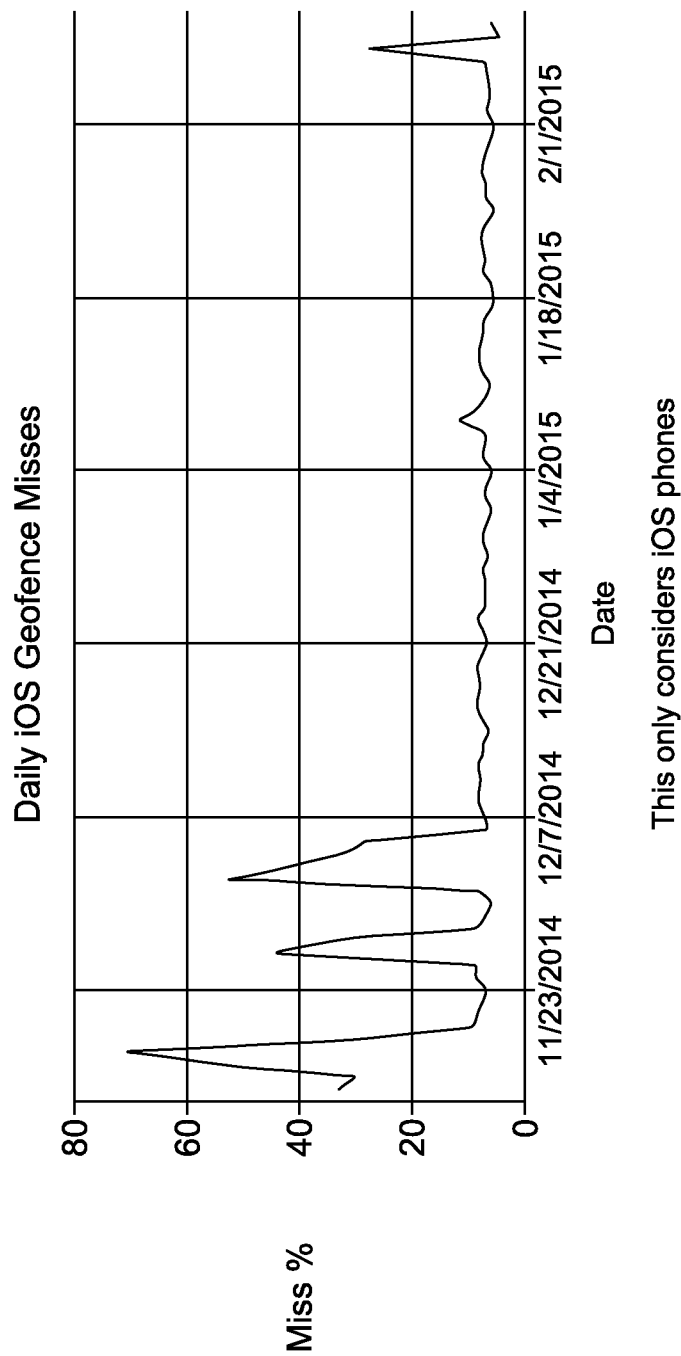
Figure 11:
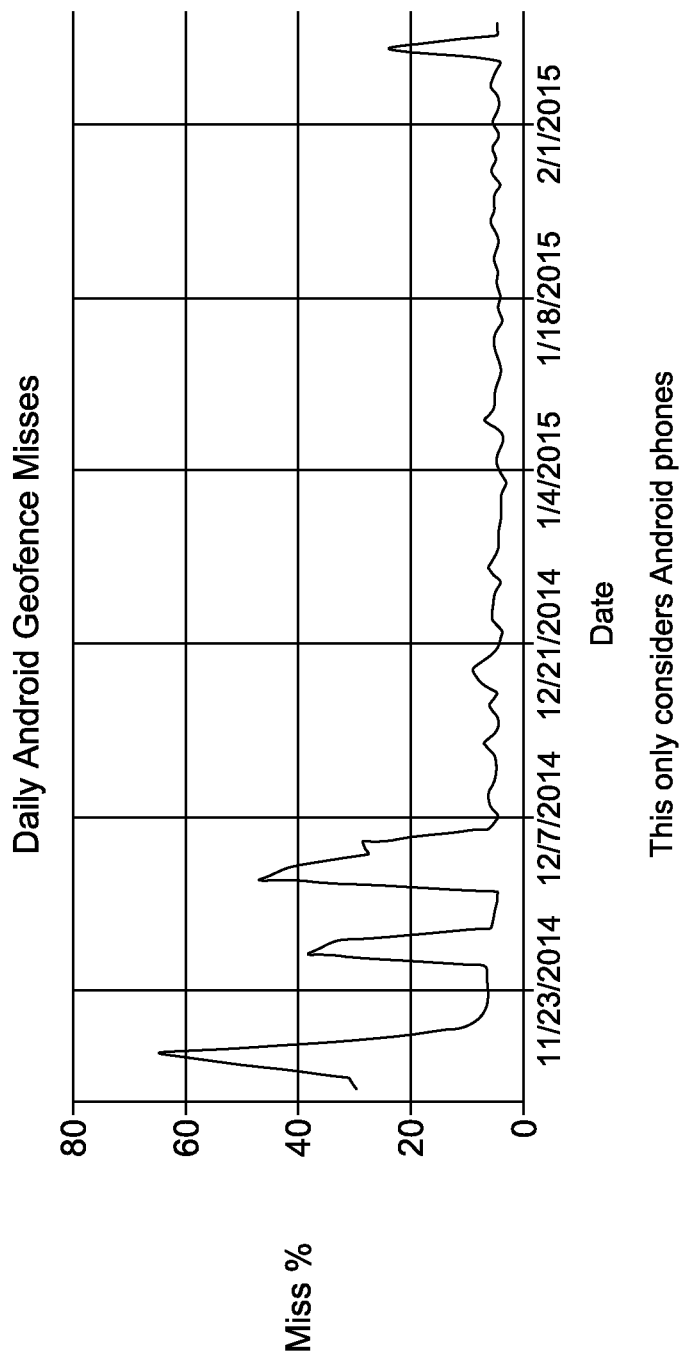
Figure 12:
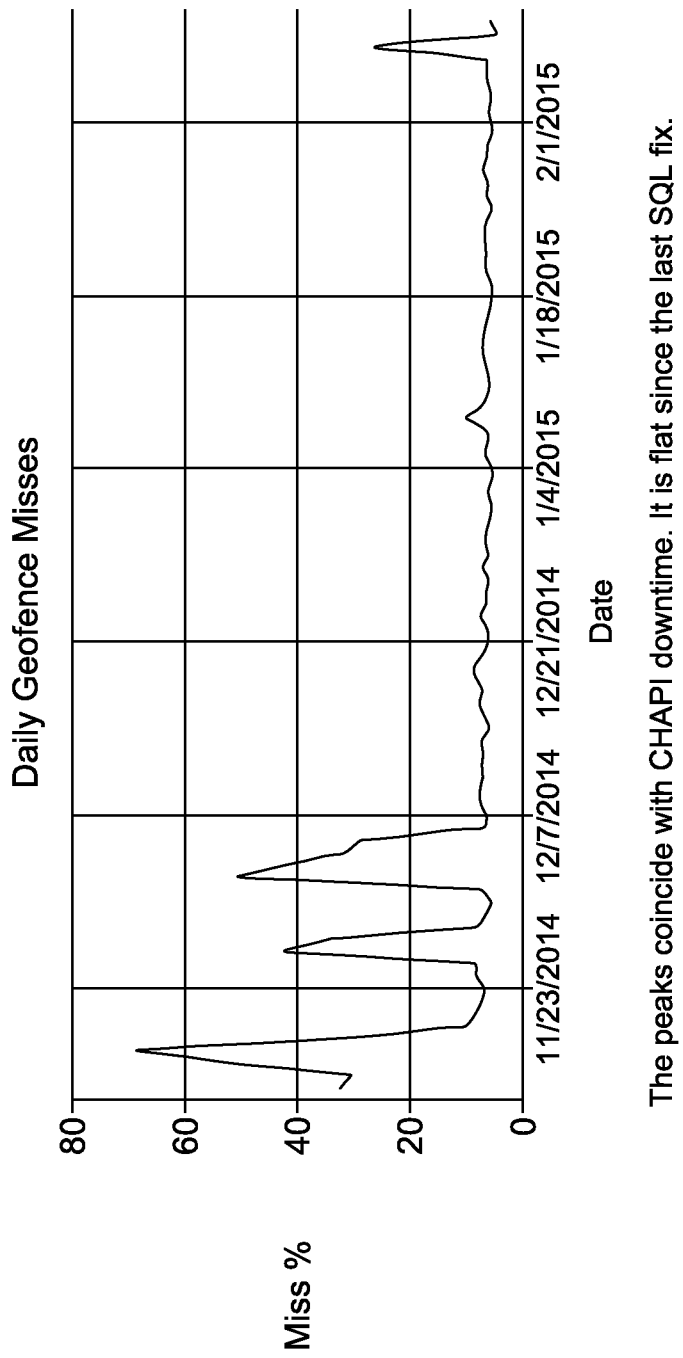
Figure 13:
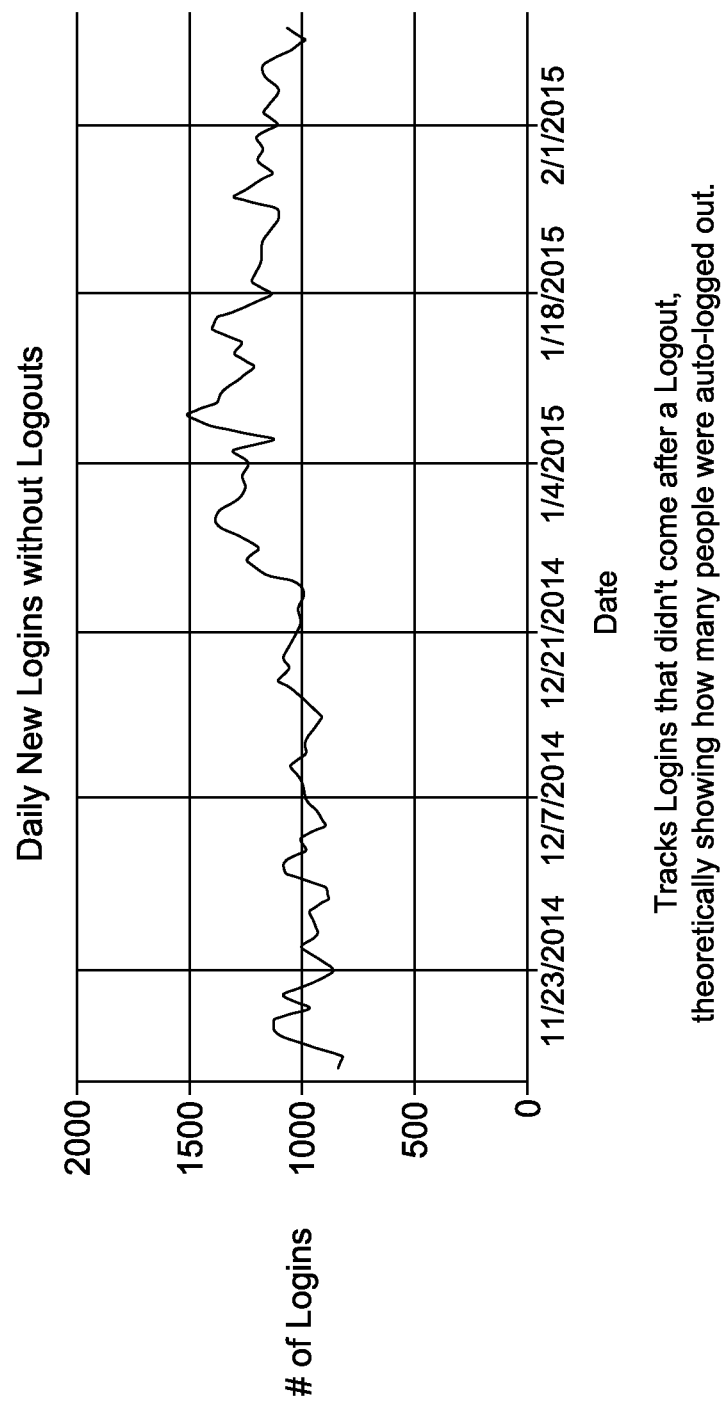

FIGS. 10 through 13 provide examples of data analysis or processing of geo-fence log data from a plurality of mobile devices. FIG. 10 shows data for geo-fence misses for mobile devices running the iOS operating system while FIG. 11 shows data for geo-fence misses for mobile devices running the Android operating system. FIG. 12 shows composite data for geo-fence misses for all mobile devices. A geo-fence miss refers to when an individual (and their mobile device) crosses a geo-fence, but the crossing is not detected. FIG. 13 shows data indicating logins that occur without a previous logout, showing how many people were auto-logged out. An auto-logout occurs when the geo-fence application program running on the user's mobile device logs the user out of the program without instruction to do so from the user. It will be appreciated that the data shown in FIGS. 9 through 13 is considered to be illustrative only.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A non-transitory computer-readable storage medium with an executable program stored thereon, wherein the executable program instructs a mobile device having location services to perform the following:
   store information pertaining to a geo-fence assigned to a building;
   identify when the mobile phone crosses the geo-fence with the aid of the location services of the mobile device;
   record a log of geo-fence crossings in a geo-fence log;
   record one or more mobile device parameters in the geo-fence log;
   upload the geo-fence log to a remote server; and
   wherein the one or more mobile device parameters comprises one or more of an executable program version, a mobile operating system version, a mobile device carrier, a log of executable program login events, a log of executable program logout events, a log of executable program opening events, a log of executable program closing events, and an indication of whether location services of the mobile device is enabled.

2. The non-transitory computer-readable storage medium of claim 1, wherein the geo-fence log records each of two or more geo-fence crossings before uploading the geo-fence log to the remote server.

3. The non-transitory computer-readable storage medium of claim 1, wherein the geo-fence log records a time stamp for each geo-fence crossing.

4. The non-transitory computer-readable storage medium of claim 1, wherein the geo-fence log records for each geo-fence crossing whether the geo-fence crossing was an inbound geo-fence crossing or an outbound geo-fence crossing.

5. A non-transitory computer-readable storage medium with an executable program stored thereon, wherein the executable program instructs a mobile device having location services to perform the following:
   store information pertaining to a geo-fence assigned to a building;
   identify when the mobile phone crosses the geo-fence with the aid of the location services of the mobile device;
   record a log of geo-fence crossings in a geo-fence log; and
   upload the geo-fence log to a remote server in response to a trigger, wherein the trigger comprises a user logging out of the executable program on the mobile device.

6. A non-transitory computer-readable storage medium with an executable program stored thereon, wherein the executable program instructs a mobile device having location services to perform the following:
   store information pertaining to a geo-fence assigned to a building;
   identify when the mobile phone crosses the geo-fence with the aid of the location services of the mobile device;
   record a log of geo-fence crossings in a geo-fence log; and
   upload the geo-fence log to a remote server in response to a trigger, wherein the trigger comprises a predetermined period of time passing without an upload.

7. The non-transitory computer-readable storage medium of claim 6, wherein the predetermined period of time is a period that is less than 24 hours.

8. A non-transitory computer-readable storage medium with an executable program stored thereon, wherein the executable program instructs a mobile device having location services to perform the following:

store information pertaining to a geo-fence assigned to a building;

identify when the mobile phone crosses the geo-fence with the aid of the location services of the mobile device;

record a log of geo-fence crossings in a geo-fence log; and upload the geo-fence log to a remote server in response to a trigger, wherein the trigger comprises a request from the remote server for the mobile device to upload the geo-fence log.

9. A non-transitory computer-readable storage medium with an executable program stored thereon, wherein the executable program instructs a mobile device having location services to perform the following:

store information pertaining to a geo-fence assigned to a building;

identify when the mobile phone crosses the geo-fence with the aid of the location services of the mobile device;

record a log of geo-fence crossings in a geo-fence log; and upload the geo-fence log to a remote server in response to a trigger, wherein the trigger comprises a user logging into the executable program on the mobile device.

10. The non-transitory computer-readable storage medium of claim 9 wherein the trigger comprises a user logging into the executable program on the mobile device via a physical login.

11. The non-transitory computer-readable storage medium of claim 9, wherein the trigger comprises a user logging into the executable program on the mobile device via an auto-login.

12. The non-transitory computer-readable storage medium of claim 9, wherein the trigger comprises a user logging into the executable program on the mobile device after a forced close of the executable program.

* * * * *